3,328,368
METHOD OF CLEAVING S—S BONDS IN ORGANIC COMPOUNDS USING METAL ORGANIC COMPOUNDS
Chi Hua Wang, Lexington, Mass., assignor to Arthur D. Little, Inc., Cambridge, Mass., a corporation of Massachusetts
No Drawing. Filed May 20, 1963, Ser. No. 281,792
7 Claims. (Cl. 260—88.7)

This invention relates to a novel chemical reaction and, more particularly, to a chemical reaction which achieves the cleavage of disulfide linkages by a redox system.

Disulfide linkages are present in many organic compounds including those which occur naturally and those which are made synthetically. It is often desirable to be able to break these linkages between the sulfur atoms in order to either modify the compound or to provide a route for the manufacture of other sulfur-containing compounds. For example, some proteins contain the disulfide linkage and it is often desirable to modify these proteins either chemically or physically to improve their properties. Thus the commonly used so-called permanent hair-waving solutions depend for their action upon their ability to temporarily break the sulfide linkages in the hair molecules for setting into a desired configuration. As another example, the modification of wool to render it more crease-resistant may be cited. The novel reaction of this invention can also be employed to provide the necessary free radicals and the reactive sites for initiating and inducing polymerization of such monomers as vinyls.

The cleavage of organic disulfides through a chemical reaction to produce thiyl radicals and mercaptide ions offers a system for biological research including the study of aging which is believed to be due to irreversible cross-linking of protein molecules, the possible furnishing of radiation protection and repair, and the possible application to chemotherapy.

In the prior art, the rupture of S—S linkages by free radical process is carried out in one of two ways—either by photodissociation or thermal agitation which is unimolecular, or by a bimolecular radical displacement reaction. The first of these methods requires supplying energy while the second requires an external radical which in turn must be generated through the expenditure of energy. In contrast to these prior art methods, the method of this invention is a novel chemical reaction which proceeds at room temperature without the need for supplying either external energy or additional radicals.

It is, therefore, a primary object of this invention to provide a new method for chemically cleaving the disulfide linkage found in organic compounds. It is another object of this invention to provide a method of modifying compounds or naturally occurring materials which contain the disulfide linkage, and hence to impart improved properties to them. It is still an additional object of this invention to provide a new polymerization catalyst system which may be used either in bulk polymerization, solution or emulsion polymerization, or in polymerization which takes place in a liquid suspension. Other objects of the invention will in part be obvious and will in part be apparent hereinafter.

The method of this invention may be characterized as the breaking of the disulfide linkage in an organic disulfide compound dissolved in a liquid organic solvent by the addition of a metal organic compound, the metal of which is capable of undergoing a change in valence state by a single electron transfer process. The components formed by the splitting of the disulfide link may be isolated through further reaction or may be used as a source of reactive sites for catalysis purposes.

The invention accordingly comprises the several steps and the relation of one or more such steps with respect to each of the others thereof, which will be exemplified in the method hereinafter disclosed, and the scope of the invention will be indicated in the claims.

Using a metal M which may be oxidized from the divalent to the trivalent state by one electron transfer process (for example, iron) the following general reaction may be written to represent the free radical process of this invention:

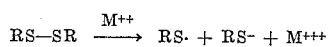
$$RS—SR \xrightarrow{M^{++}} RS\cdot + RS^- + M^{+++}$$

In like manner, any metal ion which can be oxidized to the next higher valence state by a single electron transfer process can be employed in a similar reaction.

The disulfide S—S linkages in organic compounds vary greatly in strength. Thus, it is possible to break the weaker links much more readily than those which form stronger bonds. As an example, the S—S bond in a diaryl disulfide such as diphenyl disulfide is relatively weak and may readily be broken by the process of this invention. Likewise, S—S bonds forming a portion of a cyclic ring such as in lipoic acid are generally under strain and may be more readily broken than those linkages which are not. This is also true of the cyclic disulfides such as naphthacene tetrasulfide. S—S bonds in dialkyl compounds, on the other hand, are generally stronger and less readily cleaved. However, as will be apparent from the examples given below, the process of this invention is applicable to all disulfide bonds, the cleavage of those which are stronger proceeding at a slower rate.

The organometallic compound which effects cleavage in accordance with this invention may be defined as a metal organic in which the metal is one which is capable of undergoing a change in valence state by a single electron transfer process. This organometal catalyst should be soluble in the organic liquid medium in which the reaction is carried out. Among the metals which meet this requirement are the transition metals including iron, manganese, titanium, vanadium, cobalt, nickel and the like. Among the organometal compounds which have been found to be particularly useful in furnishing the metal ion required in this invention may be listed ferrocene (dicyclopentadienyl iron) cobaltocene (dicyclopentadienyl cobalt), the metal naphthenates, and the β-diketone chelates of the transition metals. The manganese, vanadium, cobalt and iron salts of acetyl acetonate are examples of the last-named typed of organometal compounds.

The S—S bond cleavage is carried out in a medium which is an organic liquid, and at least a partial solvent for the disulfide. It is preferable to introduce the organometallic compound into the solvent first and then add the organic disulfide. However, the disulfide may be added first. This method is, of course, adaptable to a continuous process wherein a stream of the organic solvent containing the organometallic compound is continuously mixed with a stream of solvent containing the disulfide. Suitable reaction media include, but are not limited to, the lower aliphatic alcohols such as methanol, ethanol and the isopropanols, benzene and the aromatic alcohols such as phenol, and the like. If the moieties formed in the disulfide cleavage are to be used in a second reaction system, e.g., as a source of reactive sites for polymerization, then the organometallic compound is preferably introduced into the second reaction system and the disulfide added to it. This, however, may also be reversed by adding the disulfide to the second reaction system first. As an example, the organometallic compound may be dissolved in a vinyl monomer and the disulfide is then added to the monomer. Alternatively, the second reaction system may be dissolved or dispersed in a liquid reaction medium such as defined above.

The reaction is preferably carried out in a substantially oxygen-free environment. Thus it may be achieved under conditions of reduced pressure, for example $10^{-2}$ millimeters, or in an atmosphere of an inert gas such as nitrogen, argon and the like. The reaction time will depend upon the organic compound in which the disulfide linkage is present; that is, upon the strength of the disulfide bond, as discussed above. In general, compounds which contain a weak disulfide bond, i.e., a diaryl disulfide are easily cleaved at room temperatures, whereas those compounds which contain a relatively strong disulfide bond, i.e., a dialkyl disulfide, may require longer reaction times and/or elevated temperatures.

In carrying out the reaction of this invention, the organometallic compound used to effect the disulfide bond cleavage should preferably be present in an amount to furnish equal molar quantities of this component and the organic disulfide. Some variation from the stoichiometric amounts is possible.

The following examples are given to further describe the method of this invention, and they are meant to be illustrative and not limiting.

In obtaining the data for Example 1–6, 10 grams of acrylonitrile monomer and 20 mg. of the organometallic compound (equivalent to about 0.1 mol percent of the monomer) were placed in one arm of a double-arm tube. The other arm contained 20 mg. of the disulfide dissolved in methyl alcohol. The tube was evacuated to about $10^{-2}$ mm. Hg to achieve substantially oxygen-free reaction conditions and then tipped in a manner to introduce the disulfide into the monomer containing the organometallic compound. The polymerization of the monomer was indicated by the appearance of turbidity in the mixture which in turn was an indication of the cleavage of the disulfide bond to supply reactive sites for catalyzing this polymerization.

It will thus be seen that the objects set forth above among those made apparent from the preceding description are efficiently attained and since certain changes may be made in carrying out the above method without departing from the scope of the invention, it is intended that all matter contained in the above description shall be interpreted as illustrative and not in a limiting sense.

I claim:
1. Method of cleaving the S—S bond in an organic disulfide, comprising the steps of
    (a) dispersing an organic disulfide, selected from the group consisting of diaryl disulfides, substituted diaryl disulfides, dialkyl disulfides and cyclic disulfides, in an organic liquid which is at least a partial solvent therefor; and
    (b) adding to said liquid under substantially oxygen-free conditions an organometallic compound which is soluble in said liquid and which is either a $\beta$-diketone chelate or a dicyclopentadienyl derivative of a transition metal capable of undergoing a chance in valence state by a single electron transfer process.

2. Method in accordance with claim 1 wherein said organic liquid is methyl alcohol.

3. Method of polymerizing a vinyl monomer at room temperature, characterized by adding to said monomer a catalytic system comprising an organometallic compound and an organic disulfide, selected from the group consisting of diaryl disulfides, substituted diaryl disulfides, dialkyl disulfides and cyclic disulfides, whereby the S—S bond in said disulfide is cleaved to form reactive sites for polymerizing said monomer; said organometallic compound being one which is either a $\beta$-diketone chelate or a dicyclopentadienyl derivative of a transition metal capable of undergoing a change in valence state by a single electron transfer process.

4. Method of cleaving the S—S bond in an organic disulfide comprising the step of mixing together under substantially oxygen-free conditions an organometallic com-

| Example No. | Disulfide | Organometallic Compound | Turbidity Indicating S—S Cleavage |
|---|---|---|---|
| 1 | Diphenyl disulfide | Dicyclopentadienyl iron | Yes. |
| 2 | do | Vanadium acetyl acetonate | Yes. |
| 3 | Lipoic acid | do | Yes. |
| 4 | Diparatolyl disulfide | Dicyclopentadienyl cobalt | Yes. |
| 5 | Naphthacene tetrasulfide | Dicyclopentadienyl iron | Yes. |
| 6 | Di-n-heptyl disulfide | Vanadium acetyl acetonate | Yes. |
| 7 | | Dicyclopentadienyl iron | No. |
| 8 | Lipoic acid | | No. |

In Examples 1 and 5 in which ferrocene (dicyclopentadienyl iron) was used the characteristic color of ferrocenium ion was also noted, further indicating the generation of free radicals.

The examples given above illustrate that the method of this invention is applicable to cleaving the S—S bond in all types of organic disulfides. The data show the splitting of the S—S bond in a diaryl disulfide (Examples 1 and 2), a substituted diaryl disulfide (Example 4), and in two disulfides in which the S—S bond is present in a ring (Examples 3 and 5). Finally, Example 6 illustrates that it is possible also to break the S—S bond in a dialkyl disulfide. Suitable iron, vanadium and cobalt are illustrated. Finally, Examples 7 and 8 illustrate the ineffectiveness of the bisulfite or the organometallic compound alone to effect polymerization.

It will thus be seen from the above description and examples that there is provided a novel method of achieving cleavage of the S—S bond both in organic disulfide. Although it is necessary to supply a substantially oxygen-free atmosphere, the reaction of this invention does not require any drastic conditions either of temperature or pressure.

pound and an organic disulfide, selected from the group consisting of diaryl disulfides, substituted diaryl disulfides, dialkyl disulfides and cyclic disulfides, at least one of said reactants being in solution in a liquid medium prior to said mixing, said organometallic compound being either a $\beta$-diketone chelate or a dicyclopentadienyl derivative of a transition metal capable of undergoing change in valence state by a single electron transfer process.

5. Method in accordance with claim 4 wherein said liquid medium is a vinyl monomer.

6. Method in accordance with claim 5 wherein said organometallic compound is in solution in said vinyl monomer prior to said mixing.

7. Method of cleaving the S—S bond in an organic disulfide comprising the step of mixing together under substantially oxygen-free conditions and at substantially room temperature
    (a) a solution of an organometallic compound in a vinyl monomer, said compound being either a $\beta$-diketone chelate or a dicyclopentadienyl derivative of a transition metal capable of undergoing change in valence state by a single electron transfer process, and (b) an organic disulfide, selected from the group consisting of diaryl disulfides, substituted diaryl disulfides, dialkyl disulfides and cyclic disulfides, in another liquid medium which is at least a partial solvent therefor and which is miscible with said solution.

References Cited

UNITED STATES PATENTS

| | | | |
|---|---|---|---|
| 2,529,315 | 11/1950 | Serniuk | 260—88.7 |
| 2,813,849 | 11/1957 | Kern | 260—88.7 |
| 2,926,160 | 2/1960 | Kern | 260—88.7 |
| 2,979,532 | 4/1961 | MacGregor | 260—608 |
| 3,022,351 | 2/1962 | Mihm et al. | 260—608 |
| 3,049,522 | 8/1962 | Lowell et al. | 260—92.8 |
| 3,088,939 | 5/1963 | Miller | 260—88.7 |
| 3,098,060 | 7/1963 | Miller | 260—88.7 |
| 3,117,111 | 1/1964 | Natta et al. | 260—88.7 |

JOSEPH L. SCHOFER, *Primary Examiner.*

DONALD CZAJA, *Examiner.*

H. WONG, *Assistant Examiner.*